United States Patent [19]

Hagner

[11] 4,361,863
[45] Nov. 30, 1982

[54] ILLUMINATING DEVICE HAVING A CURVED OPTICAL CONDUCTOR

[75] Inventor: Willi Hagner, Solms, Oberbiel, Fed. Rep. of Germany

[73] Assignee: Ernst Leitz Wetzlar GmbH, Wetzlar, Fed. Rep. of Germany

[21] Appl. No.: 197,698

[22] Filed: Oct. 16, 1980

Related U.S. Application Data

[63] Continuation of Ser. No. 972,630, Dec. 22, 1978, abandoned.

[30] Foreign Application Priority Data

Dec. 23, 1977 [DE] Fed. Rep. of Germany ....... 2757543

[51] Int. Cl.$^3$ ............................................ F21V 7/00
[52] U.S. Cl. .................................... 362/32; 362/261; 362/268; 362/280; 362/281; 362/293; 362/308; 362/310; 362/311; 362/321; 362/335; 362/362; 362/375
[58] Field of Search ................. 362/32, 261, 268, 280, 362/281, 293, 308, 310, 311, 321, 335, 362, 175

[56] References Cited

U.S. PATENT DOCUMENTS 3,752,561 8/1973 Klemt .............................. 350/96 R
4,048,486 9/1977 Kriege .................................... 362/32

FOREIGN PATENT DOCUMENTS 878748 4/1941 France .............................. 350/96 R Primary Examiner—Stephen J. Lechert, Jr.
Attorney, Agent, or Firm—Schwartz, Jeffery, Schwaab, Mack, Blumenthal & Koch

[57] ABSTRACT

An illuminating device for providing a light beam having a substantially uniform cross-sectional flux comprising a light source, an optical conductor, the optical conducting having an inlet and an outlet surface and a curved body portion therebetween, the curved body portion forming at least substantially a portion of a circular ring, optical means for directing light from the light source to the inlet surface of the optical conductor, and means affecting the flux of light arranged transversely and displaceable to the path of the light beam between the light source and the inlet side of the optical conductor whereby the optical conductor provides the uniform flux at the outlet surface.

13 Claims, 7 Drawing Figures

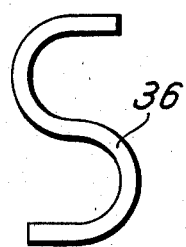
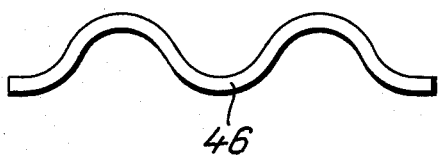
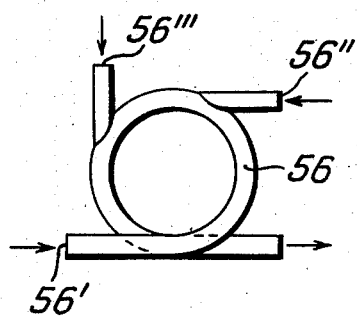
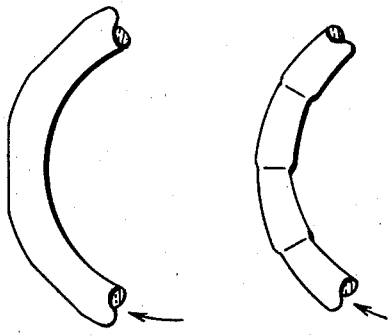
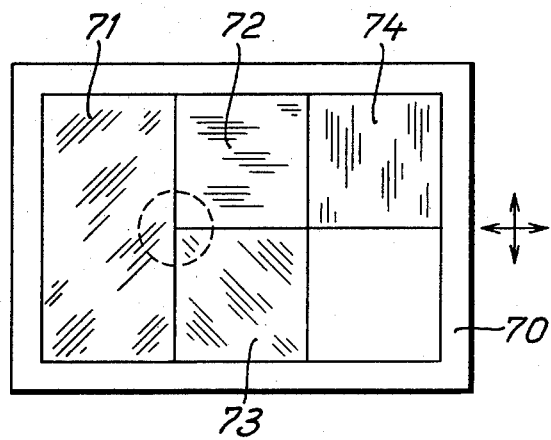

ILLUMINATING DEVICE HAVING A CURVED OPTICAL CONDUCTOR

This is a continuation, of application Ser. No. 972,630, filed Dec. 22, 1978, now abandoned.

BACKGROUND OF THE INVENTION

1. Field of the Invention

The invention concerns an illuminating device for the variable uniform illumination of an image field using a bent optical, homogeneous conductor and a source of light which is reproduced by means of an optical device on the inlet surface of the optical conductor.

2. Description of the Prior Art

Devices to uniformly illuminate an image field are known in themselves. Thus, in U.S. Pat. No. 2,604,005 there is described an installation for producing a uniform light flux from an arc lamp using a molded body provided with an inwardly acting reflecting mantle surface. The inlet area for the body which modifies the light flux of the arc lamp is larger than its outlet area. By means of reflection within the body, a certain equalization of brightness over the cross section of the flux of light is obtained.

U.S. Pat. No. 2,942,099 describes an installation whereby the light of an elongated lamp is concentrated on a small round spot and made uniformly bright over the entire area of the spot. Here again, a molded body with an inwardly acting reflecting mantle surface is utilized. The molded body has the shape of two truncated cones having their bases set up against each other. The cross section of the inlet area for the flux of light here is again larger than the outlet cross section. The intended uniformity of the exiting light flux is obtained by means of multiple reflections of the incoming light by the reflecting mantle surface.

Another conductor of light with a parabolically curved reflecting mantle surface is known from DE-PS No. 42 818. The source of light is arranged without imaging on the tip of the descending branch of the parabola. The beam of light is uniformly distributed on the outlet surface of the light flux.

The disadvantage of these known illuminating devices consists of the fact that specially shaped molded bodies are used which are therefore expensive to produce and require a relatively large space. They are therefore unsuited for devices wherein space must be conserved. Adjustments of the intensity of the illumination are possible only by means of the variation of the brightness of the lamp.

U.S. Pat. No. 3,926,501 describes an illuminating device wherein a bundle of optical conductors is provided, and supported in one focus of a rotationally symmetrical ellipsoid mirror. The lamp producing the light is located in the other focus of said ellipsoid. This arrangement also provides a certain degree of light uniformity over the cross section of the bundle of light beams leaving the bundle of optical conductors. Additionally, however, the brightness of the exiting light beam may be varied by rotating the ellipsoidal mirror relative to the inlet area of the optical conductor bundle so that the connecting line between the lamp and the inlet surface area encloses different angles with the longitudinal axis of the optical conductor bundle.

This known device thus again uses a special structural part expensive to produce, in the form of the ellipsoid mirror, which additionally requires considerable space. Because the bundle of optical conductors consist of numerous single fibers, it is necessary with respect to the control of brightness and the reproduction of the source of light to illuminate all of the individual fibers uniformly on the side of the light entrance, since otherwise the uniformity of the illumination on the outlet side would be adversely affected.

A prior art optical conductor is described in DE-OS No. 2 012 100. The optical conductor consisting of a flexible tube made of a transparent thermoplastic material filled with a liquid acting as the light transfer medium. The tube particularly may be bent in the form of a circle. By coloring the liquid, the emitted illuminating light may be adjusted independently of the source of light. Alternatively, a color filter may be provided at one end of the optical conductor. No continuous color control is provided.

SUMMARY OF THE INVENTION

It is the object of the invention to provide an illuminating device which may be produced at a low cost and which permits the continuous control of the emitted flux of light with respect to intensity and/or color temperature and/or spectral composition, while maintaining a constantly uniform illumination of an image field.

The object is obtained by means of an illuminating device of the type described in the introduction hereto, characterized according to the invention in that an s-shaped or circularly curved optical conductor is provided and that means affecting the flux of light are arranged in the path of the beam between the source of light and the inlet surface of the optical conductor. The optical conductor may have a constant diameter over its entire length, but it may also have different diameters in different sections or it may have sectionally reduced diameters. The bending radius of the circularly curved conductor is preferably approximately four times the average diameter of the optical conductor. The optical conductor may have more than one inlet surface for the light. Finally, the optical conductor may have an inwardly acting reflecting mantle surface of non-uniform configuration. A diaphragm, unilaterally slidable into the path of the beam may be provided as the means affecting the intensity of the flux of light. To vary the color temperature of the light flux at least one color filter unilaterally slidable into the path of the beam, may be provided. For the purpose of additive color mixing, the color filter may comprise centrally adjacent different color fields. The color filters may be mounted advantageously on a common carrier slidable in any direction transversely to the path of the beam. The field of application of the device is extended when the diaphragm and the color filter may be displaced independently of each other. It is advisable to arrange the diaphragm at a location wherein the flux of light has its highest possible cross section. The color filters should be placed in the vicinity of the inlet surface of the optical conductor.

The core of the new illuminating device is a bent optical conductor, which in a particularly advantageous embodiment of the invention consists of a circularly bent glass rod, wherein the radius of the ring formed by the curved rod corresponds approximately to four times the diameter of the rod. The curvature of the rod produces at the outlet surface of the optical conductor a statistically uniform distribution of light flux independently of the shape and magnitude of the primary source of light and independently of the angle of incidence of the primary radiation, i.e. independently of the degree of illumination of the inlet surface of the optical conductor. This uniform distribution results from multiple total internal reflections within the optical conductor. This property of the bent optical conductor makes it possible to slide diaphragm disks or filters at will into the path of the primary beam, wherein merely the magntiude of the area of the optical conductor bundle affects the desired light attenuation, variation of color temperature or color mixing. It is immaterial herein, whether the shuttering or filtering, respectively, takes place in a parallel or a convergent primary beam path. Particularly, the configuration of the diaphragms or of the filters is un-important, because only the ratio of the covered section to the overall cross section of the flux of light affects the control of the flux of light. Brightness may be regulated with particular precision, when the diaphragm is positioned at the widest possible cross section of the flux of the light within the device. Brightness may then be easily controlled by moving the diaphragm to block more or less of the light flux. In cases wherein the application requires very rapid variation of brightness, the diaphragm may be placed in an area with a small cross section of the light flux.

For variations of the color temperature or the color of the light, on the other hand, in most cases it is desirable to have a greater variation of the filter area compared to the total cross section of the light flux, so that it is convenient to position the filters at an area of small light flux cross sections. To obtain good reproducibility, however, it is possible to place the color filters, assuming proper dimensions, at a location of a large cross section. By displacing a color filter with centrally adjacent areas for the three fundamental colors, the proportion of said colors may be continuously varied in the overall flux of light, thus producing color mixing in a simple manner.

BRIEF DESCRIPTION OF THE DRAWINGS

The new illuminating device is described hereinafter with reference to the drawings, wherein:

FIGS. 3 and 4 show other embodiments of the optical conductor;

FIG. 5 shows an optical conductor with more than one inlet surface;

FIG. 6 illustrates an optical conductor having sections of varying diameters; and FIG. 7 shows a carrier with a filter combination to vary the color temperature and for color mixing.

DETAILED DESCRIPTION OF THE PREFERRED EMBODIMENT

Figure 1:
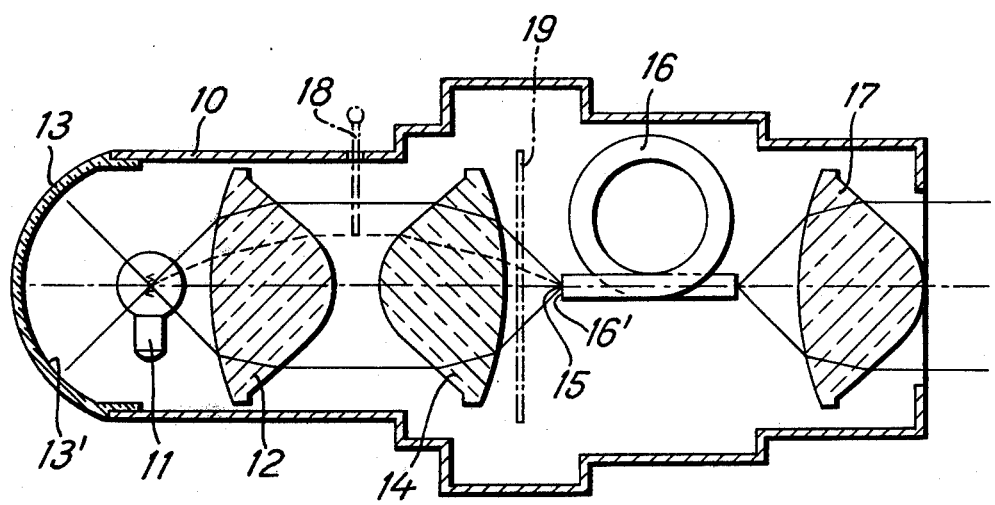
FIG. 1 shows one embodiment of the invention.
Figure 2:
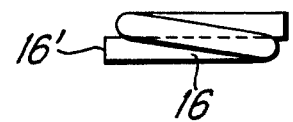
FIG. 2 is a top view of the optical conductor of FIG. 1.

FIG. 1 shows one embodiment of the new illuminating device comprising a housing 10, a lamp 11 mounted within the housing, and a corresponding condenser 12. The housing 10 is closed off by means of a cap 13, the cap carrying on its internal side a concave mirror 13'. The condenser 12 is followed in sequence by a condensing lens 14, which serves to focus the parallel beam of light leaving the condenser 12 to a point 15. An optical conductor 16 bent in the shape of a ring and having a circular cross section is arranged so that the point 15 is located in the inlet surface 16' of the optical conductor 16. The optical conductor 16 may consist for example of a suitably bent glass or plastic rod. It is essential, however, that the optical conductor 16 possesses an inwardly acting reflecting mantle surface. The bending radius is preferably approximately four times the diameter of the optical conductor. A collimator lens 17 is arranged so the light flux leaving the optical conductor 14 is converted into a parallel beam. By means of the multiple reflections within the optical conductor 16, a satisfactory uniformity of the light flux leaving the collimator lens 17 is attained. FIG. 2 shows the bent optical conductor 16 in a top view.

The optical conductor may be bent in a manner other than that shown in FIGS. 1 and 2. Examples of this are presented in FIGS. 3 and 4. FIG. 3 shows an optical conductor 36, which is bent in the shape of the letter "s", while the optical conductor 46 of FIG. 4 has the configuration of a double "S".

It may be desirable for thermal reasons to use more than one course of light to produce the bundle of light leaving the collimator lens 17. For this purpose, an optical conductor is provided with a plurality of inlet surfaces, such as shown, for example, in FIG. 5. There an annular optical conductor 56 is represented, said conductor being provided with three inlet surfaces 56', 56" and 56'". By means of a suitable choice of the location of the conductor fittings entering the annulus laterally, the effects of the reflective interferences occurring at these locations within the annulus may be kept within the negligible range.

Further embodiments of the optical conductor are possible. Thus, FIG. 6 displays two embodiments wherein the cross section of the optical conductor varies from section to section. In the example on the left hand side, adjacent sections have different cross-sectional dimensions, while in the example on the right hand side the optical conductor has a configuration over identical, successive sections, of a truncated cone, thereby providing a gradually varying diameter over each section.

As mentioned above, the optical conductors shown herein have circular cross sections. However, other cross sections are possible, such as for example, an elliptical configuration. Similarly, the input and/or output surfaces may be structured in an elliptical shape. In each of these cases, however, the internal reflection is of decisive importance. If said internal reflection is insufficient, suitable measures must be taken and possibly the mantle surface must be deformed.

The illuminating device described hereinabove represents through the insertion of the bent optical conductor the fundamental design of the device according to the invention. In the example of embodiment shown in FIG. 1, a simple diaphragm 18 is provided for the attenuation of brightness. It is inserted in front of the optical conductor 16 laterally in the path of the beam. In spite of the unsymmetrical cross section of the primary flux of light, the diaphragm produces, in cooperation with the bent optical conductor 16, a uniform attenuation of the light on the outlet side of the optical conductor 16. In the process, the diaphragm 18 naturally may also enter the path of the beam behind the condenser lens 14, in the direction of the light.

A suitable filter 19 is inserted in the vicinity of the inlet surface 16' of the optical conductor 16 for purposes of color control. A particularly advantageous embodiment of said filter is shown in FIG. 7. On a carrier 70, filter disks 71, 72, 73 with the colors green, red and violet are mounted, wherein the green colored disk 71 is twice the size of the others and disposed adjacent thereto. By displacing the carrier 70 in the direction of the arrows, any desired additive color mixture may be obtained. The filter position indicated relative to the inlet surface 16' of the optical conductor 16 for example, produces white light.

As may be seen in the example represented a filter disk 74 of a blue color is mounted laterally, said filter disk serving to alter the color temperature of the emitted light in a suitable position of the carrier 70. Naturally, the filter disk 74 may also be mounted on its own carrier.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims.

I claim:
1. An illuminating device for regulating the color temperature of a light beam having a substantially homogeneous cross-sectional flux comprising:
   (a) a light source,
   (b) a single optical conductor having a uniform cross section, said optical conductor having an inlet and an outlet surface and a curved body portion therebetween, said inlet and outlet surfaces being positioned in planes parallel to one another and said curved body portion forming substantially a full circular ring between said inlet and outlet surfaces,
   (c) optical means for directing light from said light source in a path to the inlet surface of said optical conductor, and
   (d) color filter means affecting the color temperature of light arranged transversely displaceable to the path of the light beam between said light source and said inlet surface of said optical conductor, whereby said optical conductor provides said substantially homogeneous flux at said outlet surface.

2. An illuminating device as recited in claim 1, wherein said optical conductor has a constant diameter over its entire length.

3. An illuminating device as recited in claim 2, wherein said curved body portin of said optical conductor has a bending radius of approximately four times the diameter of said optical conductor.

4. An illuminating device as recited in claim 1 wherein the optical conductor has a cross section other than annular.

5. An illuminating device as recited in claim 1 wherein said body portion of said optical conductor has a plurality of adjacent segments of differing diameters.

6. An illuminating device as recited in claim 1 wherein said body portion of said optical conductor has a gradually varying diameter.

7. An illuminating device as recited in claim 1 wherein the optical conductor has an inwardly acting, non-uniformly designed reflecting surface.

8. An illuminating device as recited in claim 1 further comprising a diaphragm for varying the light flux from said device.

9. An illuminating device as recited in claim 1 wherein said color filter means comprises a plurality of color filters of different colors positioned adjacent one another.

10. An illuminating device as recited in claim 9 wherein said color filters are mounted on a common carrier, said carrier being displaceable in any direction transversely to the path of the light beam.

11. An illuminating device as recited in claim 1 further comprising a diaphragm for varying the light flux from said device, said diaphragm and said color filter means being movable independently of each other.

12. An illuminating device as recited in claim 11, wherein the diaphragm is positioned within said device at the largest possible cross section of the flux of light.

13. An illuminating device as recited in claim 11, wherein the color filters are positioned adjacent the inlet surface of the optical conductor.

* * * * *